United States Patent Office 3,054,883
Patented Sept. 18, 1962

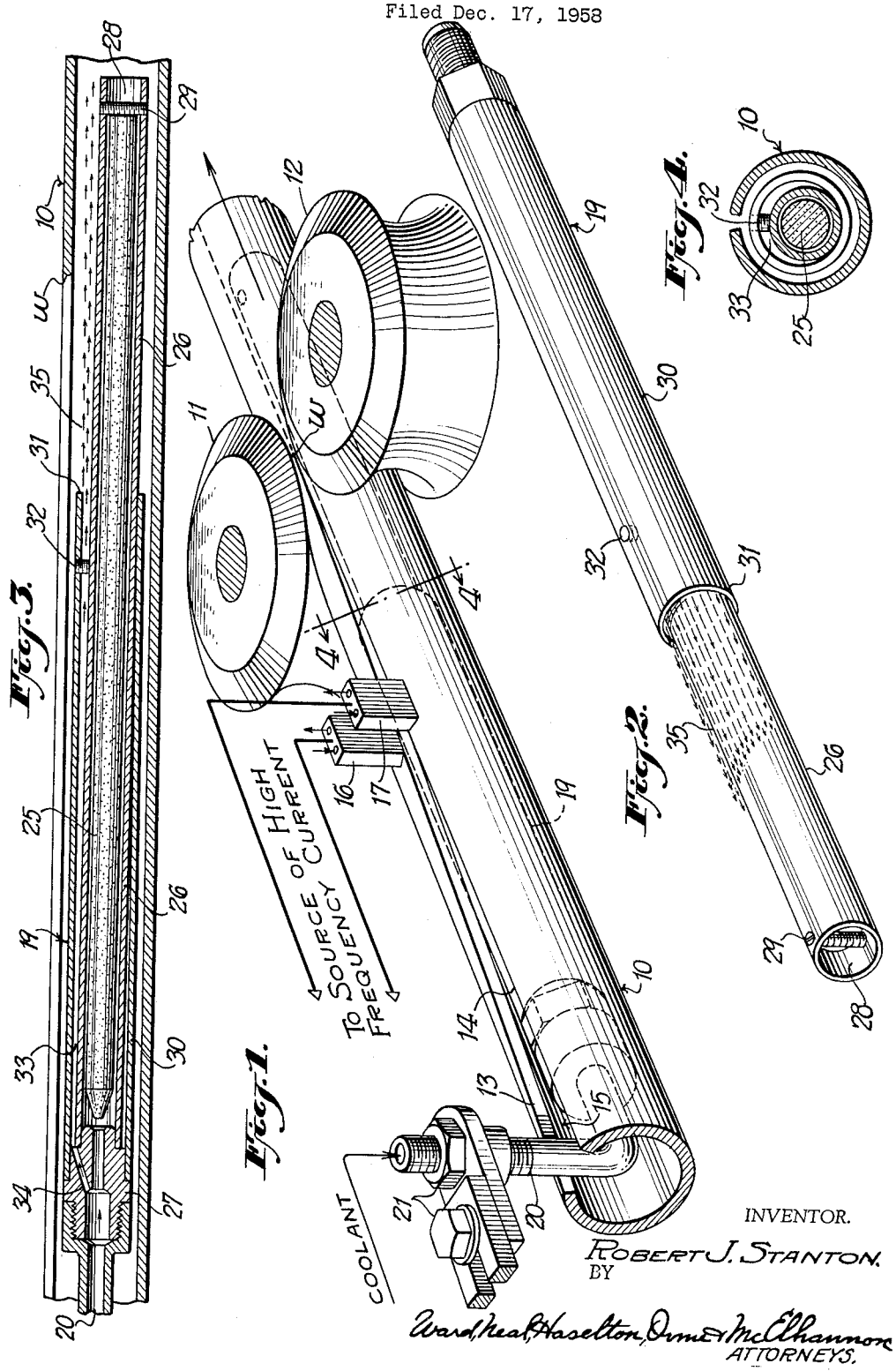

3,054,883
TUBE WELDING APPARATUS
Robert J. Stanton, Brooklyn, N.Y., assignor, by mesne assignments, to American Machine & Foundry Company, New York, N.Y., a corporation of New Jersey
Filed Dec. 17, 1958, Ser. No. 781,060
3 Claims. (Cl. 219—65)

This invention relates to apparatus for welding by the use of high frequency resistance heating, and more particularly for continuously welding seams in metal tubing.

Reference is made to U.S. patents of Wallace C. Rudd and Robert J. Stanton No. 2,818,488, granted December 31, 1957, and No. 2,833,910, granted May 6, 1958. Said patents disclose methods and means for welding together the edges defining a longitudinal gap in metal tubing as the tubing is advanced longitudinally while applying pressure thereto to close said gap at a weld point. According to said method, the heating of the gap edges is effected by the use of electrodes connected to an oscillatory current source and applied respectively adjacent the gap edges at points positioned shortly in advance of the welding point, the current being of a frequency sufficiently high so that the lowest impedance path between the electrodes follows said gap edges to and from the weld point. The present invention involves improvements upon the features of such method and apparatus.

As pointed out in the above-mentioned prior patents, in some cases, particularly if the tube diameter is relatively small, there will, however, be a tendency for at least some part of the current to flow circumferentially around the tube instead of along the edges of the V-shaped gap and there may be a tendency for the weld point to vary its position along the direction of travel of the tube with consequent loss of efficiency and irregularities in the weld. As further pointed out in said prior patents, these difficulties may be minimized by increasing the impedance of the current path from one of the contacts circumferentially around the tubing to the other, by mounting within the tubing or adjacent thereto magnetic core means or the like, with the result that this increased impedance of this path causes the radio high frequency current still further to be concentrated where it is desired along the V-shaped gap edges and also the position of the small arc which occurs at the weld point becomes more dependably stabilized at a fixed point. The possible speed of welding of the tubing may therefore be greatly increased and the quality and uniformity of the weld may be improved.

As disclosed in said patents, the magnetic core means used is preferably comprised for example of rods of sintered magnetic oxide insulation material of known types which have a low loss factor, high volume resistivity, and a permeability preferably substantially greater than unity, for example, such as the material marketed under the trade name "Ferramic" by General Ceramics & Steatite Corp. This material is a non-electrical conductor and has a Curie point in the range of about 200° to 300° F. However, since the heated tube edges and the arc at the weld point will come very close to such material, particularly if the tube diameter is small, sufficient radiant heat may reach such core material either to cause same to crack or to raise its temperature above the Curie point temperature, so that it ceases properly to function. But, as disclosed in said Patent 2,833,910, these difficulties may be avoided by providing an impeder suitably constructed and located within a tube and through which tube a coolant fluid constantly flows whereby the magnetic portion of the impeder may be maintained at a temperature below its Curie point.

While the construction disclosed in said latter patent has proven highly successful for use in the welding of certain types of tubing, particularly steel tubing, yet in the welding of tubing of certain metals, such as aluminum, alloys thereof, brass or copper, it has been found that there is a strong tendency for metallic or oxide particles substantially as a spray (which will hereinafter be called "spume") to be thrown off from the tube metal at the vicinity of the weld point and this spume tends to lodge and accumulate upon the surface of the impeder construction just beneath the tube gap. Such spume may comprise particles of oxides or particles of the tube metal thrown off from the small arc at the weld point and thus such material is electrically conductive. If such deposits are not avoided or promptly disposed of, they will tend to build up to a considerable volume which is difficulty to dislodge without stopping the operation of the equipment for cleaning from time to time. Such accumulations, if allowed to remain, may short circuit the edges of the tube gap in advance of the weld point, resulting in the causing of a hole to occur in the welded tubing. Also, since such accumulations of the spume are conductive, in view of the close proximity of the high frequency current on the tube gap edges, any accumulated masses of the spume may become inductively heated thereby possibly injuring the impeder or its housing, or causing prohibitive agglomerations to occur at the region of the weld point.

In accordance with the present invention, these difficulties are very effectively eliminated by providing the impeder not only with a housing for containing the coolant surrounding the impeder as in said Patent 2,833,910, but also an additional and outer housing, preferably in the form of another insulation tube or shroud from which a film of coolant, preferably cooling water or of a soluble oil, is caused to emanate and form a liquid barrier between the underside of the weld point region and the upper surface of the impeder, such fluid barrier causing the spume to be immediately cooled and carried along before it has a chance to impinge or accumulate on the impeder construction. Thus the apparatus may be operated continuously for many hours without interruption for cleaning or other purposes.

It is a serious problem to provide suitable clearance for the various parts of the impeder as well as the means above mentioned for disposing of the spume problem, especially when welding tubing of relatively small diameter, but with the present invention this problem is solved by conducting the coolant which is to dispose of the spume to the desired position through a crevice-like opening between the housing for the impeder and an outer surrounding length of insulation tubing of somewhat larger diameter and preferably so positioned that such crevice will be of crescent-shaped cross section so that it will discharge the coolant fluid barrier at the desired location and of a shape also having a crescent-shaped cross section and largely filling the space between the impeder and the region of the weld point.

Various further and more specific objects, features and advantages of the invention will appear from the description given below, taken in connection with the accompanying drawings, illustrating by way of example certain preferred forms of the invention.

In the drawings:

FIG. 1 is a perspective view showing the general arrangement of the apparatus embodying the invention;

FIG. 2 is a perspective view of the improved impeder construction embodying the invention, including the shroud or the like for discharging the barrier film of coolant between the region of the weld point and the impeder housing;

FIG. 3 is a longitudinal sectional view of a preferred embodiment of the invention as located within the tubing being welded; and FIG. 4 is a sectional view taken substantially along line 4—4 of FIG. 1.

Referring to the drawings in further detail, the tube which is to be welded is indicated at 10 advancing in the direction of the arrow shown through a tube mill which may include a pair of pressure applying rollers as at 11 and 12 which engage opposite sides of the tubing near the region of the weld point *w* and so that the opposite edges 13 and 14 within the V-shaped gap 15 are firmly brought together. The contacts or electrodes by which the radio frequency current is applied to the gap edges are indicated at 16 and 17, these preferably being fluid-cooled as shown in the above-mentioned previous disclosures and being located slidably to engage at or adjacent the gap edges a suitable distance in advance of the weld point. As disclosed in said patents, the frequency of the current used preferably is of the order of 100,000 cycles per second or higher, for example 300,000 to 500,000.

The improved shrouded impeder of the present invention is indicated by dotted lines at 19 in FIG. 1 and same may be supported as by a tube 20 extending out through the gap 15 and through which the coolant may be introduced. This tube may be suitably adjustably supported, as by means indicated at 21, to permit longitudinal and vertical adjustment of the impeder arrangement as desired with respect to the position of the advancing tubing 10 and the desired weld point.

As further shown in FIGS. 2 and 3, the impeder may comprise one or more lengths or rods 25 of magnetic material, as above mentioned, surrounded by housing means, such as an insulation sleeve 26, supported from a suitable coupling fixture of brass as at 27 or some other and preferably nonmagnetic material and through which the coolant fluid, such as water or a soluble oil, may be continuously introduced from the pipe or tube 20. A part of such coolant flows into and through the insulation housing 26 enveloping and thereby cooling the impeder elements 25 after which the coolant is discharged through the outlet 28 of its impeder housing tube. The impeder rods may be retained, as by a pin 29, against being dislodged from the tube 26.

An additional tube 30 suitably mounted on the fixture 27 at one end extends from such fixture preferably part way of the length of the tube 26 and so as to terminate at 31 preferably substantially in advance of the location of the weld point *w*. The tubes 26 and 30 are preferably formed of a durable rigid insulation material which will not readily be injured by accidental heating. For example, fiber glass tubing impregnated with epoxy resins may be used for the purpose.

The inside diameter of the tube 30 is made preferably somewhat larger than the outside diameter of the tube 26 so that there will be a crevice therebetween. And a suitable means, such as a small plastic pin as at 32, may be affixed in the wall of tube 30 to extend down and bear against the wall of tube 26 whereby the clearance space between the tubes will largely occur as at 33 along the upper surface of the tube 26. It will be apparent from FIGS. 2 and 4 that this clearance space will have a cross sectional shape of a crescent. A part of the coolant fluid introduced through pipe 20 is by-passed through a small passage, as at 34, to enter into the clearance space 33 and to be discharged therefrom as a barrier film 35 providing a "shroud" shield or barrier between the region of the weld point and the upper surface of the tube 26. This barrier film will have the general cross sectional shape of a crescent closely conforming to the upper surface of the tube 26 and more or less filling the space between said surface and the inside surface of the tube 10 at the region of the weld point. Thus particles of spray or spume emanating from the region of the weld point will have no opportunity to lodge upon the tube 26 but will be constantly and immediately cooled and swept on. The presence of the liquid coolant at and around the weld point with the method of high frequency resistance heating used will in no way be detrimental to the welding action.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention. It will be understood that while in the drawings as described the V-shaped gap and the weld point are located on the upper side of the tubing being welded, yet the arrangement need not, of course, necessarily be so positioned that the welded seam will be on the upper side as the apparatus may be turned in various other positions or even inverted and thus the words such as "upper" and "lower" as used herein are intended merely to explain the relative positions of the parts.

What is claimed and desired to be secured by Letters Patent is:

1. In apparatus for welding together the edges of a longitudinal gap in metal tubing, which apparatus includes means for advancing the tubing longitudinally while bringing its edges together at a weld point in a narrow V-shaped formation, a pair of contacts mounted for engagement respectively by surfaces of said tubing along opposite sides of the gap and in advance of the weld point, a source of current having its terminals connected to said contacts, respectively, and being of a frequency whereby such current will follow a path from one of said contacts along one edge of the gap to the weld point and back along the opposite edge to the other contact, an impeder assembly embodying core means having high volume resistivity when maintained below its Curie point, means for mounting same inside the tubing in position relatively thereto whereby to increase the reactance of current paths extending between said contacts circumferentially of the tubing; the improvement which comprises providing a tubular passage extending along externally of said impeder assembly and having a discharge opening at a point in advance of said weld point and directed forwardly in the direction of advance of the tubing being welded, such opening being shaped to project a shroud of liquid when passed therethrough forwardly along beneath said gap in advance of the weld point, thence along beneath the weld point and beyond for providing a barrier between the region of the weld point and said impeder assembly and acting to sweep spume from the region of the weld point forwardly into the tubing being welded and away from the portions of the gap in advance of the weld point.

2. Apparatus for welding together the edges of a longitudinal gap in metal tubing which comprises: means for longitudinally advancing the tubing while bringing said edges together at a weld point; means for applying high frequency current to said edges to heat same to welding temperature upon arrival at said point, magnetic core means and means for mounting same inside the tubing and beneath the weld point for increasing the reactance of current paths extending circumferentially of the tubing, a container for said means, means for supplying and passing a fluid coolant about the core means within said container, and a tube surrounding portions of the container in advance of the weld point, the inside walls of portions of said tube being spaced from the exterior surface of said container thereby to provide a tubular passage of generally cresent-shaped cross-section therebetween and having an open discharge end in advance of the weld point but directed longitudinally and forwardly within the tubing being welded and along past and beneath the weld point, and means for by-passing a portion of the coolant fluid through said tubular passage to discharge therefrom an unrestricted fluid barrier which is also of generally cresent-shaped cross-section in advance of and passing forwardly along beneath the weld point for sweeping forwardly in the advancing welded tubing the spume emanating from the region of the weld point and preventing such spume from accumulating on said container.

3. Apparatus for welding together the edges of a longitudinal gap in metal tubing comprising: means for longitudinally advancing the tubing while bringing said edges together at a weld point; means for applying high frequency current to said edges to heat same to welding temperature in advance of the weld point; elongate magnetic core means and means for mounting same inside the tubing for providing an impeder assembly extending along within the tubing and adjacent the region of the weld point for increasing the reactance of the current paths extending circumferentially of the tubing, a tubular member within the tubing being welded and embracing portions of said impeder assembly which are substantially in advance of the weld point, a clearance space being provided between the inner, upper walls of said tubular member and the upper surface of the impeder assembly, said clearance space being so dimensioned as to provide at the end of said tubular member in advance of the weld point a fluid projecting vent directed forwardly in the direction of advance of the tubing being welded, means for continuously forcibly introducing a flushing fluid into said clearance space for discharge forwardly through said projecting vent at the end of said tubular member nearest the the weld point, the discharged fluid providing an unrestricted film barrier between the region of the weld point and impeder assembly portions therebelow, such film barrier acting to sweep forwardly in the advancing welded tubing the spume emanating from the region of the weld point and preventing such spume from accumulating on the impeder assembly.

References Cited in the file of this patent
UNITED STATES PATENTS

| | | |
|---|---|---|
| 1,933,954 | Andren | Nov. 7, 1933 |
| 2,189,339 | Black et al. | Feb. 6, 1940 |
| 2,833,910 | Stanton et al. | May 6, 1958 |